C. C. STUTZ.
APPARATUS FOR THE MANUFACTURE OF GLASS ARTICLES
APPLICATION FILED APR. 8, 1912.

1,037,366.

Patented Sept. 3, 1912.

3 SHEETS—SHEET 1.

WITNESSES:

INVENTOR

C. C. STUTZ.
APPARATUS FOR THE MANUFACTURE OF GLASS ARTICLES.
APPLICATION FILED APR. 8, 1912.
1,037,366.
Patented Sept. 3, 1912.
3 SHEETS—SHEET 2.
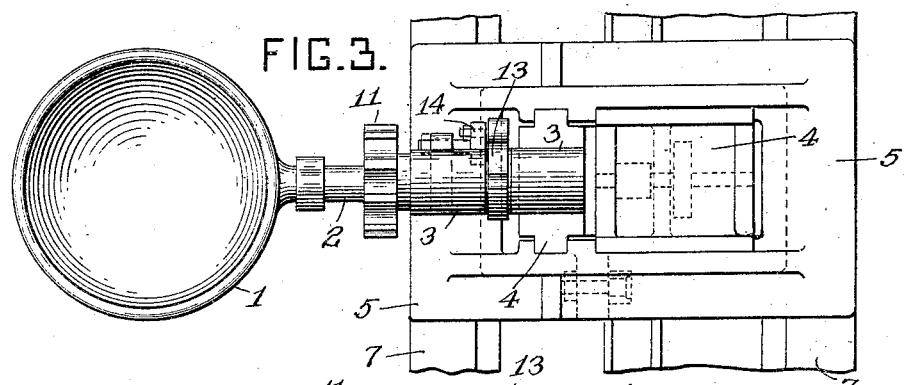
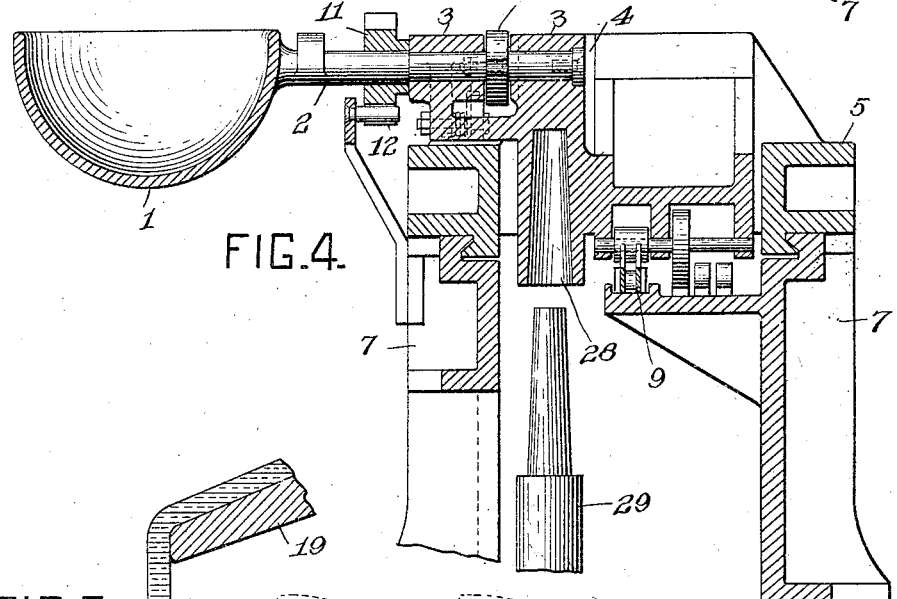
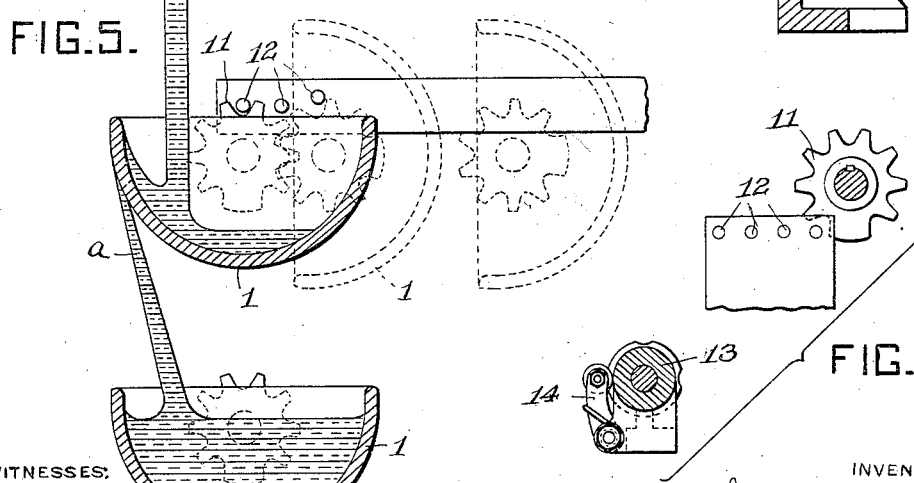
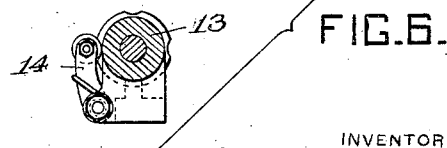

C. C. STUTZ.
APPARATUS FOR THE MANUFACTURE OF GLASS ARTICLES.
APPLICATION FILED APR. 8, 1912.
1,037,366.
Patented Sept. 3, 1912.
3 SHEETS—SHEET 3.
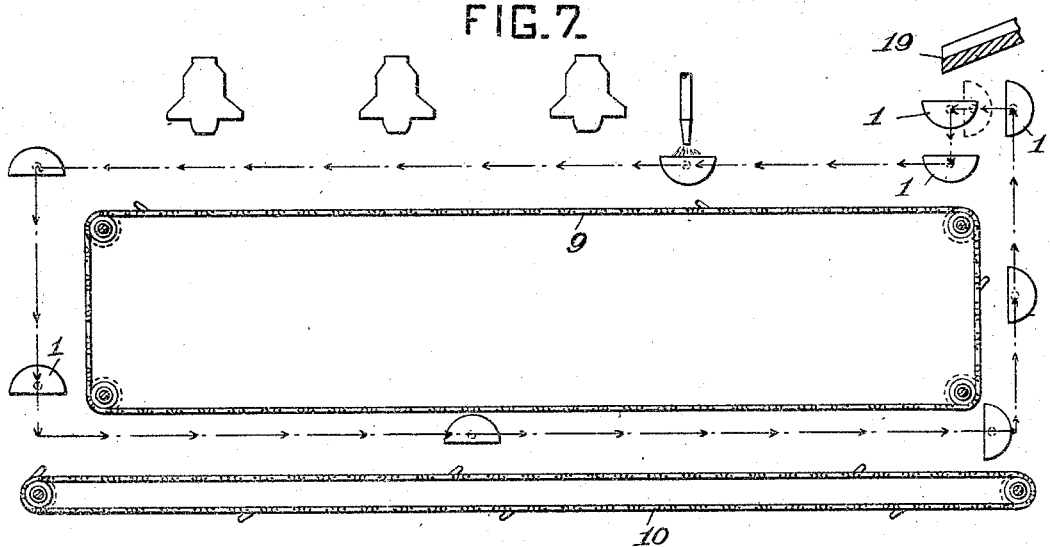
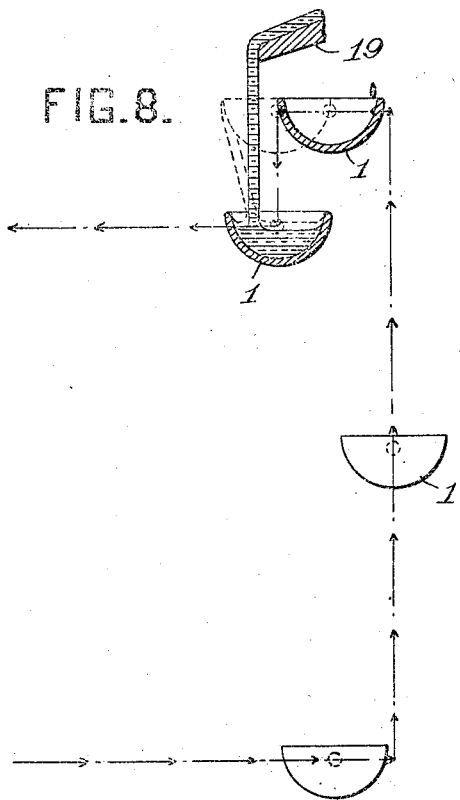
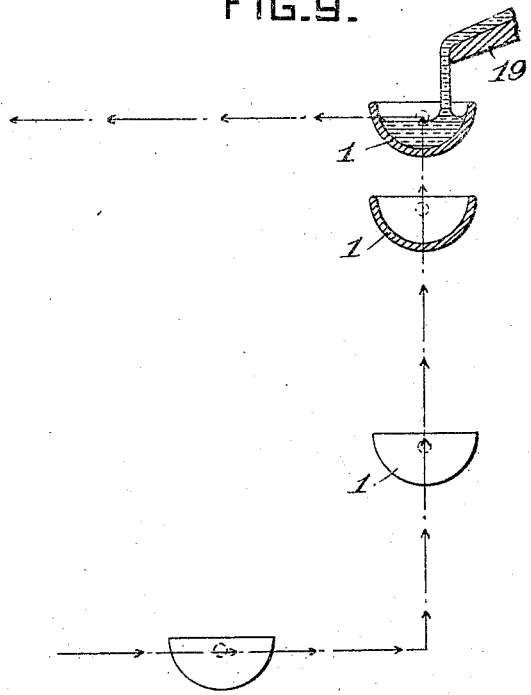

UNITED STATES PATENT OFFICE.

CHARLES C. STUTZ, OF NORWOOD, OHIO.

APPARATUS FOR THE MANUFACTURE OF GLASS ARTICLES.

1,037,366.

Specification of Letters Patent. Patented Sept. 3, 1912.

Application filed April 8, 1912. Serial No. 689,159.

*To all whom it may concern:*

Be it known that I, CHARLES C. STUTZ, residing at Norwood, in the county of Hamilton and State of Ohio, a citizen of the United States, have invented or discovered certain new and useful Improvements in Apparatus for the Manufacture of Glass Articles, of which improvements the following is a specification.

In applications Serial Nos. 676,465 and 682,375 filed respectively February 8th and March 8th 1912, are set forth methods of charging transfer vessels from a stream of molten glass flowing from a furnace or other container. It is characteristic of these methods that in replacing a charged vessel or ladle with an empty vessel both vessels are in alinement vertically and horizontally or move in a common path, and that the glass begins to flow into the empty vessel adjacent to one side and that when the charged vessel passes from under the flowing stream a strand of glass is drawn across the opposite edge of the vessel. During the filling of the vessel the point of entrance of the stream moves along a chord of the circle formed by the edge of the vessel, and in case any imperfections are produced by the inflowing stream, they will not be found in the portion of the glass forced into the mold, when the latter is charged in the manner described in application Serial No. 678,041 filed February 16th, 1912, said method consisting generally, generally stated, in immersing the open end of the mold in the glass in the vessel or ladle, and then subjecting the surface of the glass to fluid pressure.

The invention described herein consists generally stated in moving the empty vessel or ladle into the line of flow of the stream in a plane out of line vertically with the plane of movement of the charged vessel away from the stream.

The invention is hereinafter more fully described and claimed.

Figure 1:
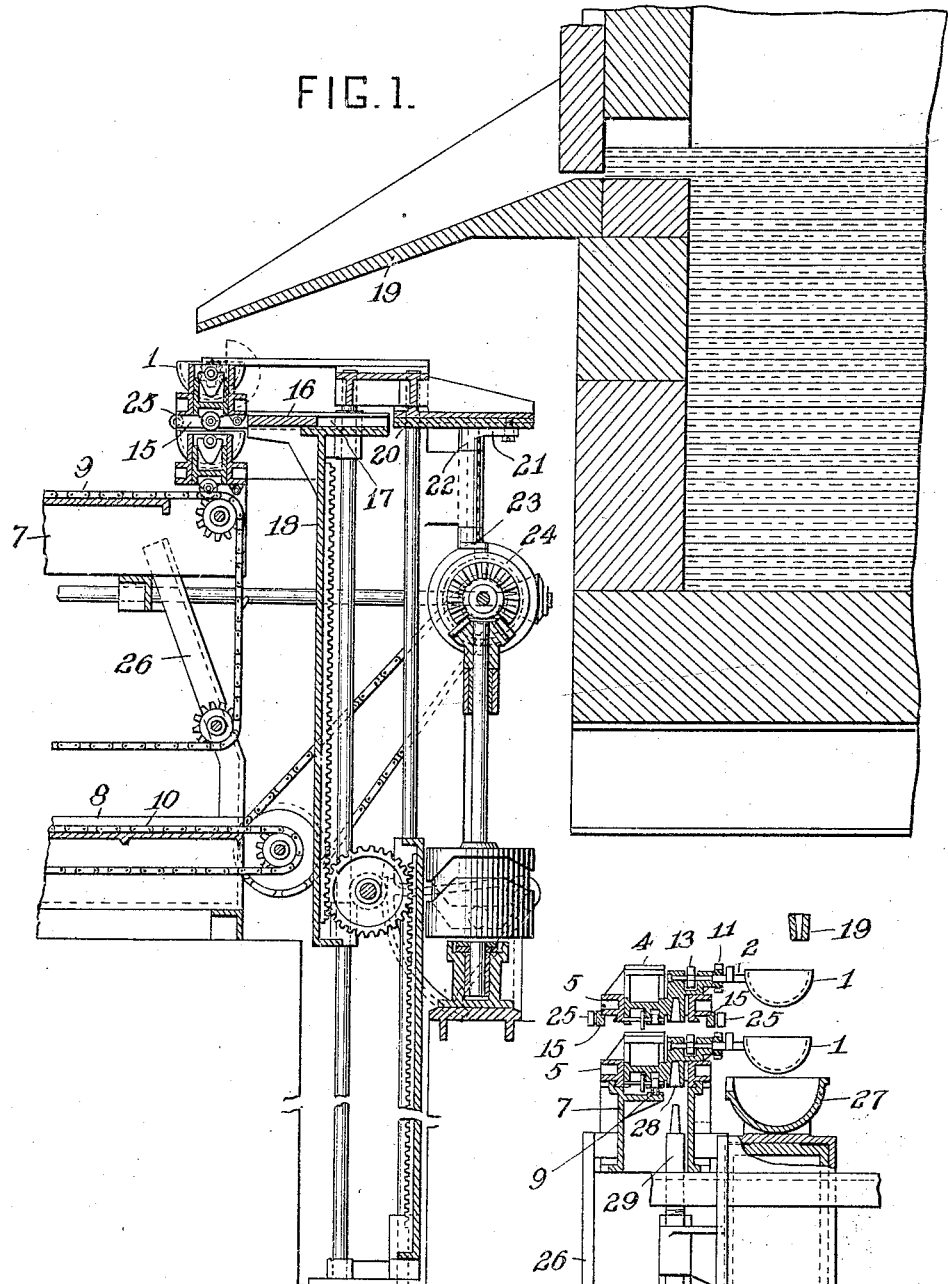
Figure 2:
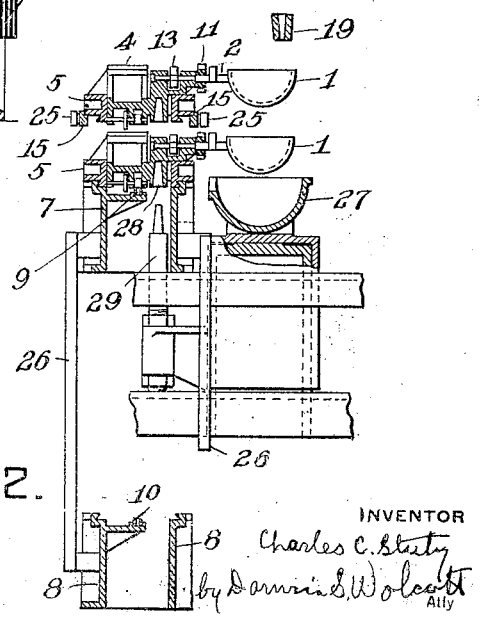

In the accompanying drawings forming a part of this specification, Figure 1 is a sectional elevation showing a portion of a furnace having a discharge and a portion of ladle transfer mechanism adjacent to the furnace; Fig. 2 is a vertical section on a reduced scale of the transfer mechanism; Figs 3 and 4 are plan and sectional views on an enlarged scale showing the ladle slide and carriage; Fig. 5 is a sectional view showing the movements of the empty ladle to receiving position; Fig. 6 shows in detail means for turning and locking the ladle; Fig. 7 is a diagrammatic view showing the cycle of movement of the ladles; Figs. 8 and 9 are diagrammatic views showing modifications of the movements of successive ladles from and into receiving positions.

In the practice of my invention it is preferred to employ ladle transfer mechanism similar except as regards the portions adjacent to the furnace, to that shown and described in applications Serial Nos. 676,465 and 682,375 hereinbefore referred to. As set forth in said applications the ladles 1 are secured to shafts 2 mounted in bearings 3 on the slides 4 which are vertically movable in guides on the carriages 5. The carriages are adapted to be moved along ways 6 on the upper and lower frames 7 and 8, by means of chains 9 and 10 which are provided with means for engaging and being disengaged from the carriages as fully set forth in said applications. The carriages with their slides and ladles after being discharged are lowered from the level of the ways of the upper frame to the level of the ways of the lower frame by lowering mechanism, and are moved from such lowering mechanism and along the ways of the lower frame 8 by the chain 10. While the carriages are on the ways of the upper frame, the ladles are moved into such relation to the open ends of molds as to permit of the forcing of glass from the ladles into the molds by atmospheric or a higher pressure as set forth in application Serial No. 678,041. After the molds have been discharged they are inverted to discharge the glass remaining in the ladle and while in this position are moved along the ways of the lower frame, and during this movement are cooled. During the latter portion of their movement along the lower frame, the ladles are so turned through an arc of 90 degrees that the mouths of the ladles will face in the direction in which the ladles move along the upper frame. The turning of the ladles to discharge the glass, and to bring it to the position just stated and also to shift it to receiving position as will hereinafter appear, may be effected by any suitable means, but preferably by the means shown and described in the applications referred to. This means consists of toothed wheels 11 secured on the ladle shafts 2 and a series of pins 12 secured to a stationary part of the apparatus at the points where the ladle is to be turned. In order to hold the ladles in the different positions to which they are shifted disks 13 provided with notches in their peripheries fastened on the ladle shafts and spring actuated dogs 14 are so mounted on the slides 4 as to engage the notches in the disks.

From the lower frame the carriages 5 carrying the slides and ladles, are moved onto the arms 15 of the slide 16, which is mounted in suitable guides 17 on the vertically movable carriage 18 of the elevating mechanism at the furnace ends of the upper and lower frames 7 and 8. While any suitable elevating mechanism may be used, that shown and described in the applications referred to, is preferred. By this elevating mechanism the carriages are raised to a point intermediate the spout 19 extending from the furnace or other glass receptacle and the upper frame 7.

The movements of the several parts of the apparatus are so timed, that a carriage with its ladle will reach the position described before another ladle, the carriage of which rests on the upper frame 7, is properly charged. As soon as this ladle has received the proper quantity of glass, the pusher 20 at the upper end of the elevating mechanism is operated to so shift the slide 16 as to move the ladle toward the stream of glass. During the latter portion of the movement the ladle is also turned toward receptive position. By these combined horizontal and turning movements the advancing edge of the ladle is moved across the line of flow of the glass, as shown in Fig. 5, and thereafter the glass will flow into the second ladle. The strand $a$ of glass extending from the charged ladle to the second ladle is severed by any suitable shearing means or may be ruptured by the movement of the charged ladle along the upper frame 7 toward the molds. As soon as the second ladle has been moved as described to intercept the stream of glass the carriage of the charged ladle will be engaged by the chain 9 and moved along the upper frame to operative relation to one of the molds, into which a portion of the glass is charged in the manner set forth in the application referred to. While the pusher 20 may be operated by any suitable means, it is preferred to move it by a crank arm 21, on the shaft 22, which is provided at its lower end with a second crank arm 23 provided with a roller extending into a cam groove in a rotating drum 24 as shown in Fig. 1. As soon as the charged ladle has been shifted along the upper frame 7, as stated, the member 18 of the elevator is lowered to place the ladle carriage 5 on the guide ways of the upper frame 7. As the member 18 continues its downward movement after the carriage 5 is placed on the frame 7, rollers 25 on the arms 15 bear upon inclined bars 26, whereby the slide 16 is moved back in the guides 17.

The movements of the carriages along the frame 7 is arrested as soon as the proper ladle reaches operative relation to the proper mold, preferably raising the slides 4 out of engagement with the hooks on the chain 9, as described in application Serial No. 682,375. As soon as the movement of the carriage is arrested the slides 4 and ladles are raised so as to immerse the lower ends of the molds in the glass contained in the ladles. The upward movement of the slides and ladles are preferably effected by fluid pressure mechanism, as in the application above referred to. When the glass is forced into the molds by pressure above that of the atmosphere, the movable members of the lifting mechanisms are provided with ladle inclosing basins 27. But when atmospheric pressure is employed to move the glass the basins are omitted. In order that the slide and ladles may move uniformly, the lifting mechanisms have secured thereto stems 29 having their upper ends shaped to enter sockets in the legs 28 on the slides 4, as clearly shown in Fig. 4. When the ladles and molds are brought into the relation necessary for the transfer of the glass the ends of the molds will be approximately central of the ladle, and in order to insure clear glass being charged, it is preferred that in filling the ladles the stream should enter the ladle at points or along lines outside of the center of the ladle, as shown in Fig. 2. By thus causing the stream to enter the ladle eccentrically, the strand 3 of glass when cut or ruptured will drop into the ladle outside of the portion of the glass entered by the end of the mold.

Figs. 8 and 9 show diagrammatically modifications in the movements of a charged and empty ladle relative to the stream of glass and also to each other, whereby the empty ladle is placed in the line of flow of glass. In Fig. 8 the empty ladle is raised to a position intermediate the spout or outlet from the supply receptacle and the plane of movement of the charged ladles to operative relation to the molds. In this respect the construction indicated in Fig. 8 is similar to that indicated in Figs. 1, 5 and 7. But in lieu of interposing the empty ladle between the spout and charged ladle by a rotary and horizontal momement, the empty ladle being in receptive position is caused to intersect the stream of glass by a horizontal movement only. In Fig. 9 the empty ladle is moved into the line of flow of the glass but below the ladle being charged, which is in position to be moved horizontally to operative relation to the mold. As soon as such ladle is charged it is moved toward the mold and out of the line of flow of the glass, so that the latter will drop into the empty ladle below, which is then raised to the plane of movement of the ladles toward the molds. Although the glass will be heated to such a temperature, that no detrimental cooling will probably occur during the charging of a ladle and its movement to a mold, so that the glass will reach the mold in proper condition, it may under some conditions be desirable to heat the glass in the ladle, especially to soften any chilled skin which may form on its surface. To this end one or more suitable burners or other heating means are arranged in such position relative to the path of the ladles from charging point to the molds, that heat of more or less intensity may be applied to the glass as shown in Figs. 7.

I claim herein as my invention:

1. In an apparatus for the manufacture of glass articles, the combination of means for maintaining a constant stream of glass, series of two or more ladles or receptacles, means for shifting the ladles or receptacles when charged from the line of flow of the glass, and means for moving another receptacle into such line of flow prior to the shifting of the charged ladle.

2. In an apparatus for the manufacture of glass articles, the combination of means for maintaining a constant stream of glass, a series of two or more ladles or receptacles means for shifting the ladles or receptacles when charged from the line of flow of the glass, means for moving a second ladle into the line of flow of glass in a plane intermediate the source of the stream and the charged ladle.

3. In an apparatus for the manufacture of glass articles, the combination of means for maintaining a constant stream of glass, a series of two or more ladles or receptacles, means for shifting the ladles when charged from the line of flow of glass, means for moving a second ladle horizontally in a plane intermediate the source of supply and the charged ladle, and means for rotating the ladle during such horizontal movement.

4. In an apparatus for the manufacture of glass articles, the combination of means for maintaining a constant stream of glass, a series of molds, a series of ladles or receptacles, a frame extending from the stream of glass under the series of molds, means for shifting the ladles when charged along said frame to operative relations to the molds, means for raising an empty ladle to a plane intermediate the source of the stream of glass and the ladle being charged, means for shifting the empty ladle to intercept the flow of glass, and means for lowering the second ladle to the level of the frame.

In testimony whereof, I have hereunto set my hand.

CHARLES C. STUTZ.

Witnesses:
ALICE A. TRILL,
THOMAS B. JOYCE.